No. 626,859. Patented June 13, 1899.
I. W. COLBURN.
GLASS WORKING MACHINE.
(Application filed Feb. 14, 1899.)

(No Model.) 7 Sheets—Sheet 1.

Fig. 1.

Fig. 1a.
Fig. 1b.

Witnesses:
J. M. Fowler Jr
V. B. Newton

Inventor:
Irving W. Colburn
by Henry H. Bates,
his Attorney

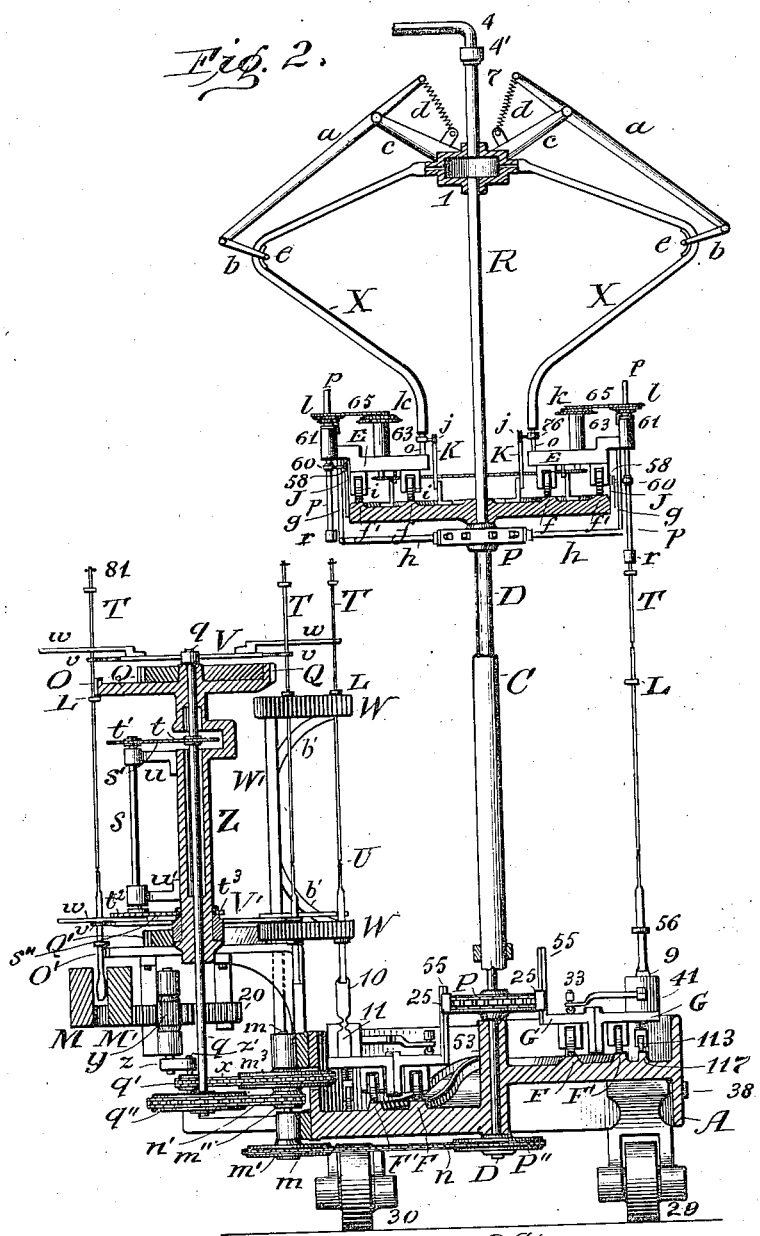
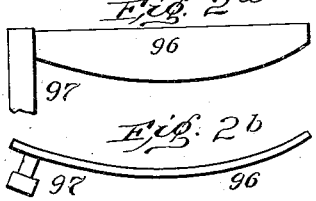

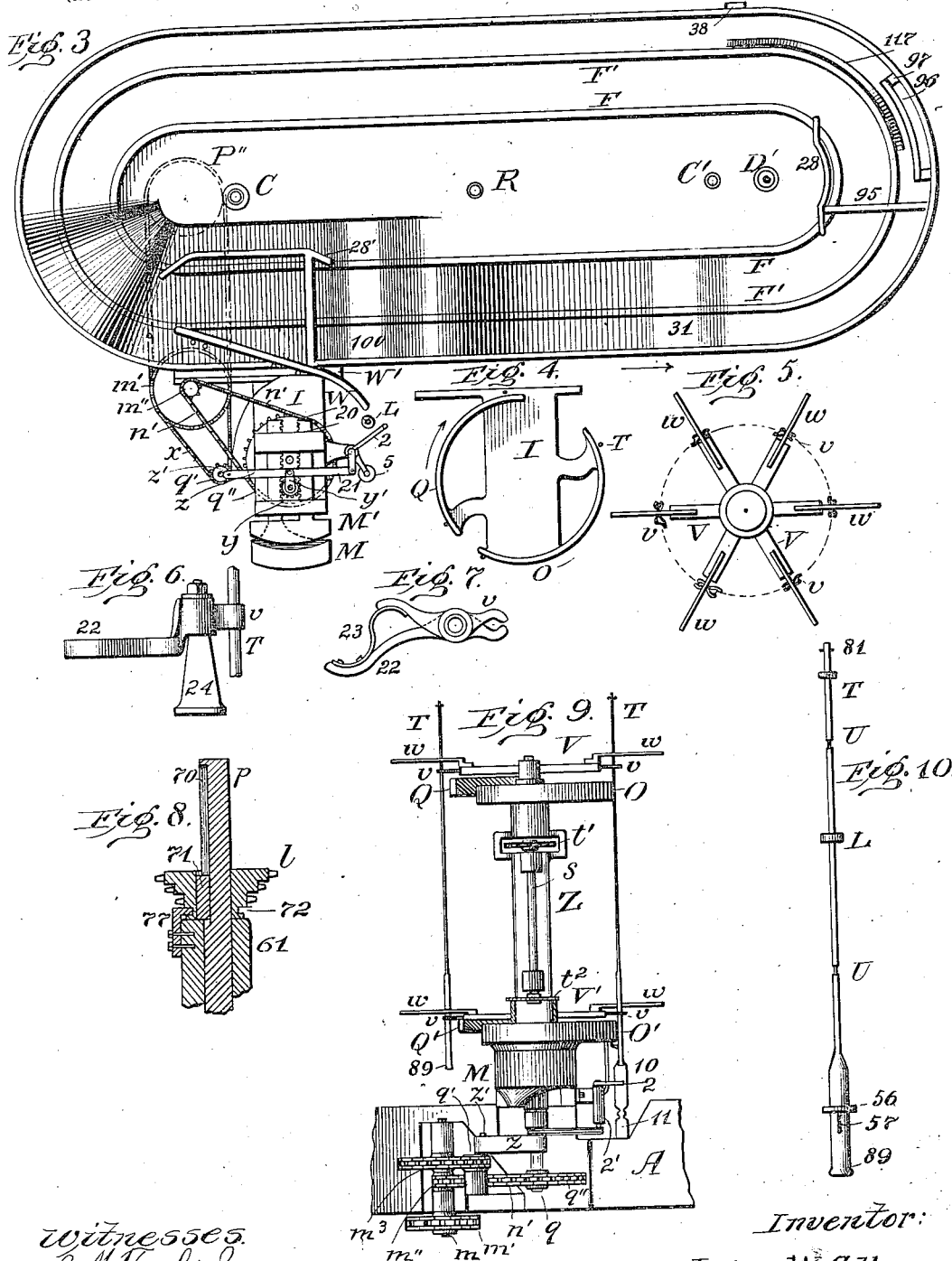

No. 626,859. Patented June 13, 1899.
I. W. COLBURN.
GLASS WORKING MACHINE.
(Application filed Feb. 14, 1899.)
(No Model.) 7 Sheets—Sheet 4.
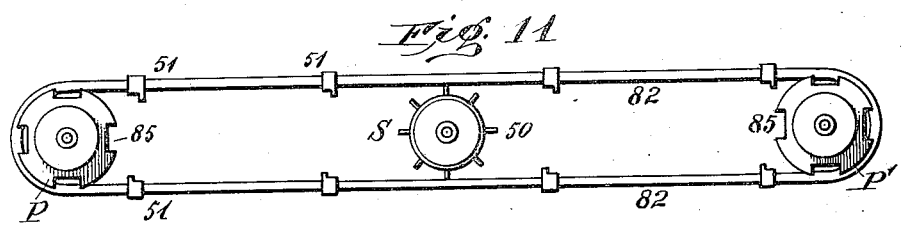
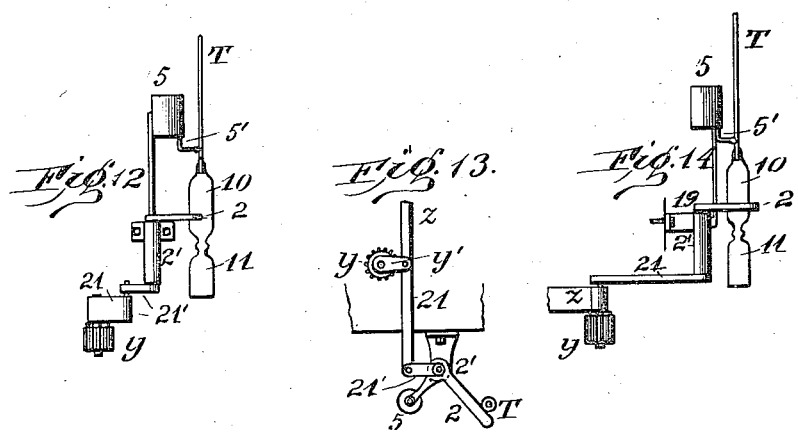
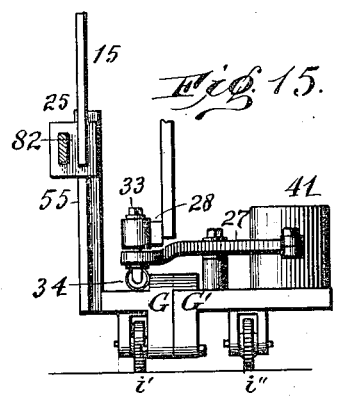
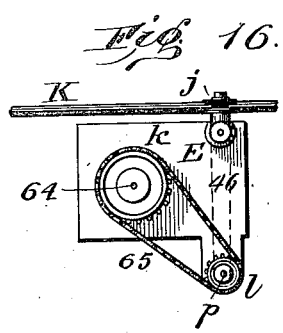
Witnesses:
J. M. Fowler, Jr.
Virgil B. Newton
Inventor:
Irving W. Colburn
by Henry H. Bates,
his Attorney

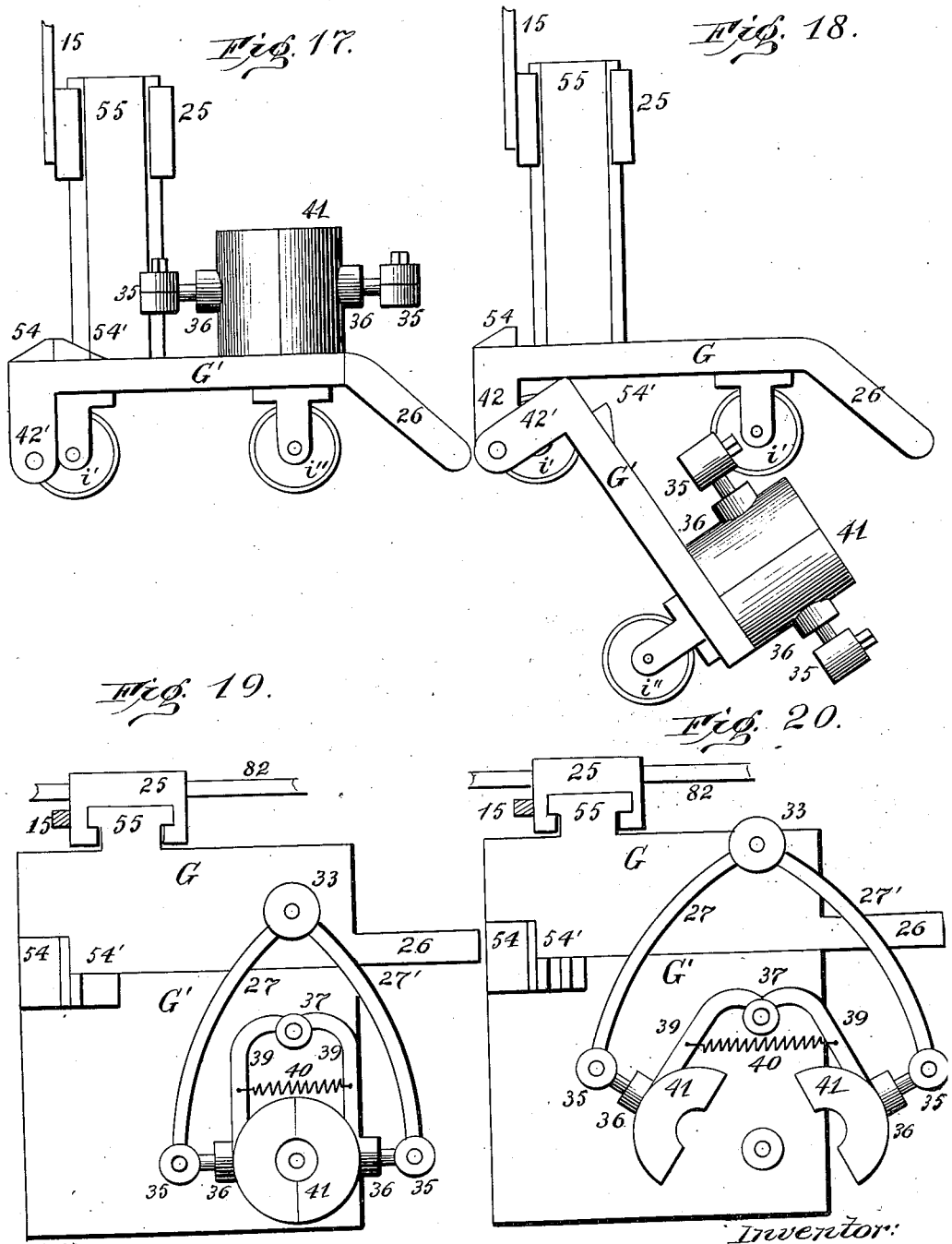

No. 626,859. Patented June 13, 1899.
I. W. COLBURN.
GLASS WORKING MACHINE.
(Application filed Feb. 14, 1899.)
(No Model.) 7 Sheets—Sheet 6.
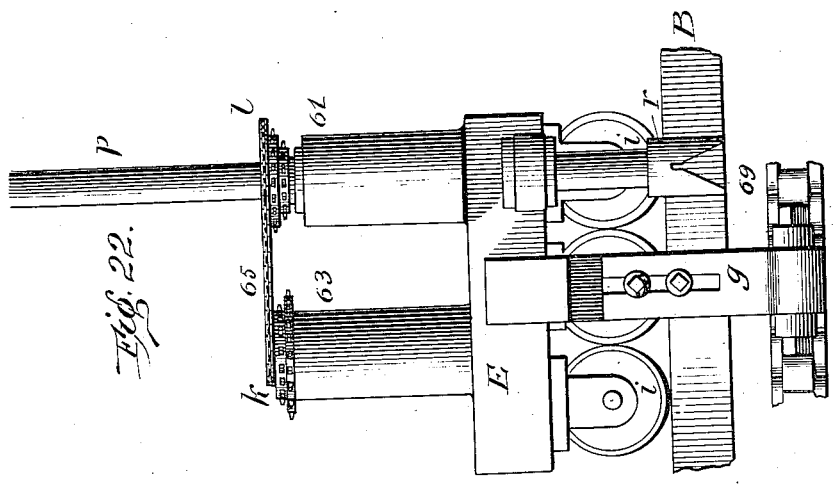
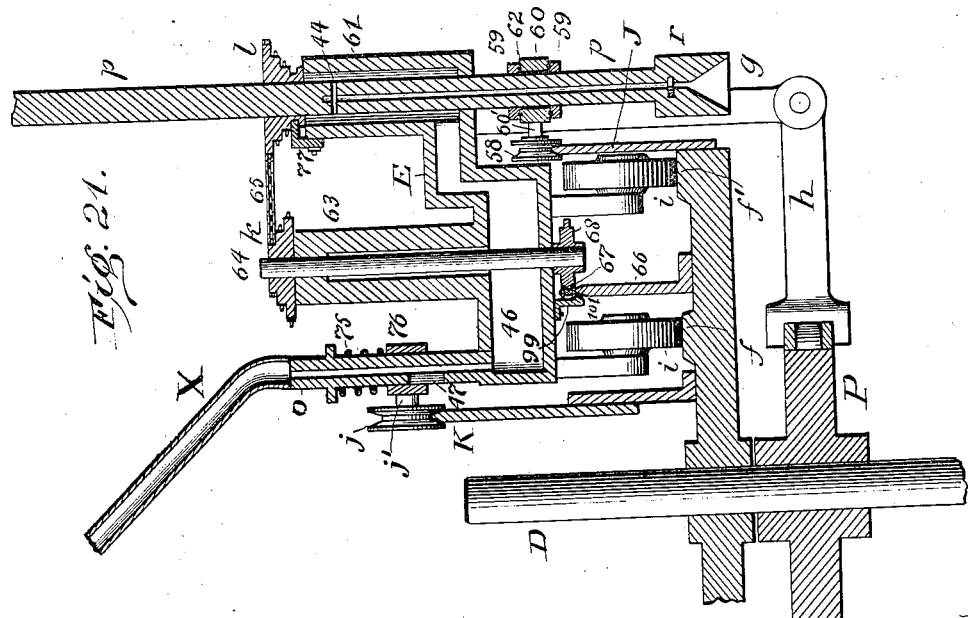
Witnesses:
J. M. Fowler Jr.
Virgil B. Newton
Inventor:
Irving W. Colburn,
by Henry H. Bates,
his Attorney

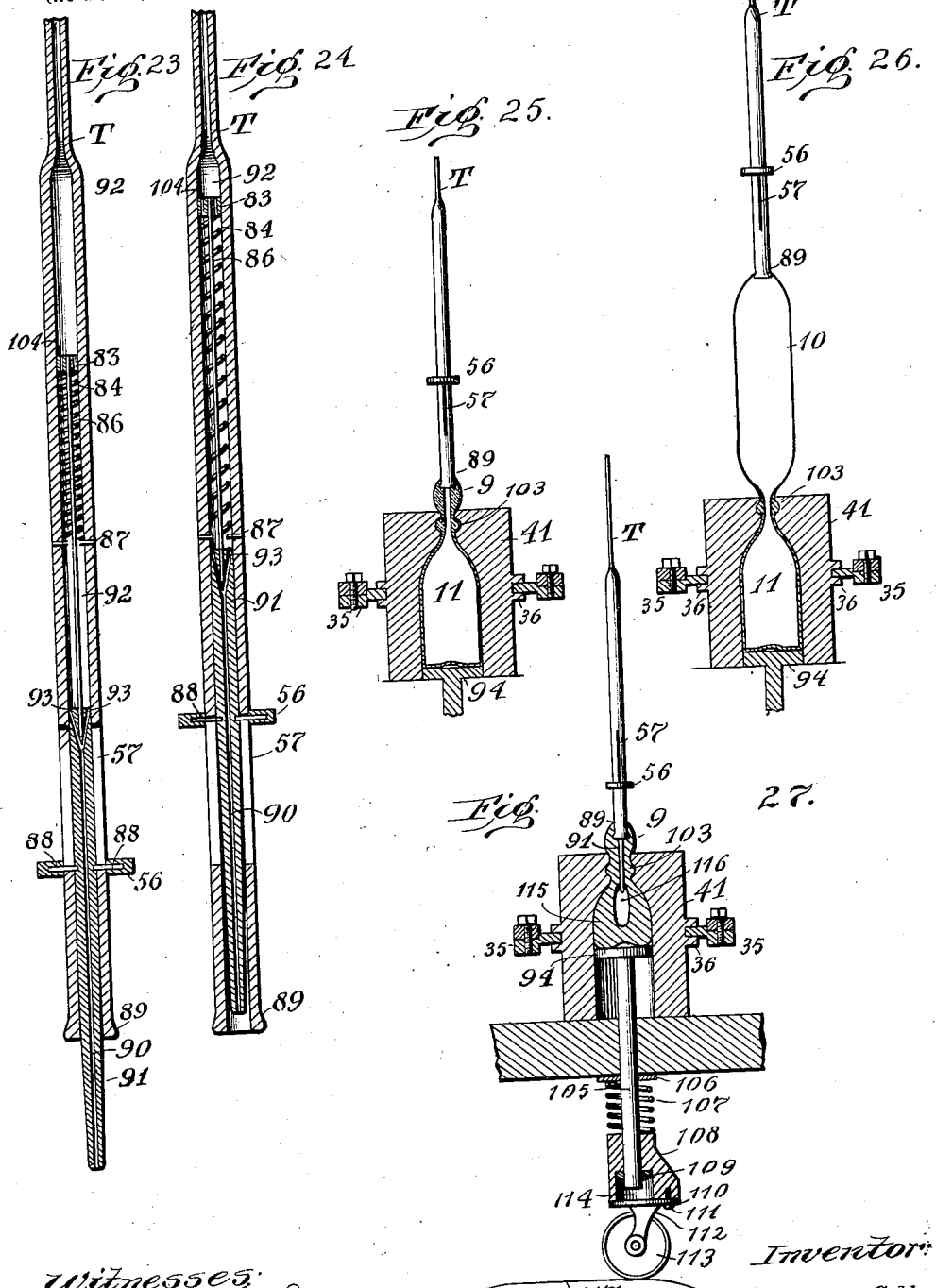

UNITED STATES PATENT OFFICE.

IRVING W. COLBURN, OF TOLEDO, OHIO.

GLASS-WORKING MACHINE.

SPECIFICATION forming part of Letters Patent No. 626,859, dated June 13, 1899.

Application filed February 14, 1899. Serial No. 705,475. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for forming articles of glass.

The object is to produce an improved machine that can be operated with sectional molds, either paste lined or unlined, for producing the better quality of glassware—such as chimneys, tumblers, &c.—with an ordinary blow-iron, and also for making that class of glass products which have a formed or manipulated neck, mouth, or lip, such as bottles and jars, using a specific blow-iron, also to make the cheaper quality of glass articles in unlined molds.

In the drawings forming a part of this specification, Figure 1 is a side elevation of the machine, partly in section. Figs. 1ª and 1ᵇ are side and bottom views, respectively, of the bridge-piece used in bridging tank 31, Fig. 1. Fig. 2 is an end elevation of the main machine and the auxiliary separator, partly in section. Figs. 2ª and 2ᵇ are elevation and plan views, respectively, of the stationary cam on the end of the machine shown in side elevation in Fig. 1. Fig. 3 is a plan view of the base of the machine, showing the lower trackways, the depressed portions, the location of the stationary cams, and a plan view of the separator. Fig. 4 is a plan view of a portion of the separator-frame, showing in detail cam-tracks O and Q. Fig. 5 is a plan view of the revolving star-wheel of the separator, showing mode of carrying clamps. Fig. 6 is a detail view in elevation of the clamp and clamp-support. Fig. 7 is a plan view of the clamps. Fig. 8 is a vertical sectional view of the mechanism for revolving the blow-iron spindle and permitting it to rise and fall while revolving. Fig. 9 is a side elevation of the separator, partly in section. Fig. 10 is a detail view of the specific blow-iron. Fig. 11 is a plan view of the mechanism for intermittently revolving central shaft R. Fig. 12 is a detail view, in end elevation, of a portion of the separator. Fig. 13 is a plan view of details of the separator. Fig. 14 is a detail view, in side elevation, of the same portions of separator shown in Figs. 12 and 13. Fig. 15 is an end elevation of the double mold-carriage traveling on lower trackways. Fig. 16 is a plan view of the car traveling on the upper trackway. Fig. 17 is a side elevation, enlarged, of the double mold-carriage and sectional mold. Fig. 18 is a side elevation of the double mold-carriage, showing the front portion depressed in the act of dipping the mold. Fig. 19 is a plan view of the double mold-carriage and sectional mold closed. Fig. 20 is a plan view of the double mold-carriage and sectional mold opened. Fig. 21 is an end elevation of the upper traveling car, mostly in section, showing air-chest and air-regulating mechanism. Fig. 22 is a front elevation of upper car. Fig. 23 is a vertical sectional view of the plunger blow-iron, showing internal construction, plunger protruded. Fig. 24 is a vertical sectional view of the plunger blow-iron, plunger retruded. Fig. 25 is an elevation, partly in section, showing the bottle in sectional mold fully formed, blow-iron still attached, and plunger withdrawn into the blow-iron. Fig. 26 is an elevation, partly in section, showing the bottle in mold completed, plunger retracted, and glass attachment stretched ready for breakage and detachment. Fig. 27 is an elevation, partly in section, showing the sectional mold as used when unlined, the blow-iron in operative relation with gathering of plastic glass on same, air-blast just started, plunger descended to form the neck, bottom-former raised and giving elastic support to the glass while being pierced with the plunger and ready to expand and give room for the formation of the bottle.

Like letters and numerals of reference refer to like parts in the several figures.

Referring to the said drawings, A represents the base portion or bottom of the frame of the machine, upon which the whole mechanism is assembled and borne. This base is supported on truck-wheels 29 and 30, on which it can be conveniently moved from place to place. Said base has two trackways F and F' running entirely around the same parallel to each other, Figs. 1, 2, and 3. Track F is level, with the exception of where it descends into depression 100 for a short distance, Fig. 1, whence it ascends again to the original level. Track F' is level, with the same exception, and also except where it descends alone into depression 31, Fig. 1, and ascends again to former level, for purposes hereinafter explained. Base A also supports an upper portion or plane B, carrying level trackways $f f'$. On said base A are two bosses or hubs 52, into which are inserted and firmly secured the two columns C C', which support said plane B. These columns are made in two parts, with sleeve-like couplings 14 secured to the lower part at 13, into which the upper portions of the said columns movably extend. Said upper portions are screw-threaded and fitted to run in screw-threaded hand-wheels Y Y, which rest on the top of sleeve-couplings 14 and serve to raise and lower the top portion or frame plane B, after the manner of jack-screws to adjust the same for height when molds of different lengths are used in the machine. Base A also supports a separator, an auxiliary mechanism, (shown in detail in Figs. 2, 3, 4, 5, and 9,) which is firmly secured to said base, at one side thereof, by its frame I, Fig. 3.

The column C (left hand, Fig. 1) sustains its share of the upper plane B. The column C' (right hand, Fig. 1) sustains, in addition to its share of upper plane B, an electric motor N, mounted on a suitable bracket 18, with its train of gearing 16, by which motion and power are transmitted to upright rotary shaft D'. This shaft, with its companion shaft D, is supported on base A in hubs or bosses 53, fitted with suitable bearings, and they have their upper bearings in upper plane B. Said shafts are fitted with heavy sprocket-wheels P P P' P', over which run the sprocket-chains 69 82, through which motion and power are transmitted from D' to D and also to the traveling vehicles, cars, or carriages presently to be described. The column C' also supports the electric rheostat 17, through which electric energy is transmitted from some external source of electric power to the motor N, the concealed wires or cable entering the machine by a suitable socket connection at 38, Figs. 2 and 3, and passing into the base and up through the interior of the column to the said rheostat, whence after passing suitable resistances the current is conducted to the said motor N. An arm $a'$ is provided to turn the current on and off. Motion is transmitted from said motor through train of gearing 16 16 to the vertical power-shaft D', whence it is distributed to other portions of the machine. On base A is also borne the upright central rotary shaft R, passing up through the upper plane B. This shaft is solid throughout its entire length and is preferably sustained at bottom on antifriction appliances, such as ball-bearings, to receive end thrust. At its top it bears the air-box 1, from which extend the flexible pipes X X, one on each side, for supplying the top cars with air. In the top of said air-box and in axial alinement with rotary shaft R is fixed the pipe 7, which rotates with the air-box and is connected by a suitable air-tight coupling 4' with air-inlet pipe 4, which pipe may be flexible, conveying air under pressure from a suitable external source of supply. The flexible air-pipes X X are supported as follows: On air-box 1 are mounted the standards $c c$, supporting rocker arms or levers $a a$, each held elastically at one end by a spring $d$ and having at the other end link $b$, which sustains flexible pipe X by means of a curved saddle support $e$, which allows flexure without permitting too sharp a bend. The pipes are thus kept properly extended, while being allowed to assume the various positions shown in Figs. 1 and 2 due to the form of the trackways. At the base of rotary shaft R is fixed a striker-wheel S, Figs. 1 and 11, bearing eight striker-arms 50, by means of which it receives periodical impulses from sprocket-chain 82 to give it intermittent rotary motion through strikers 51, attached at suitable intervals to said sprocket-chain. The sprocket-wheels P P' are recessed, as shown at 85, Fig. 14, to permit said strikers to pass.

On base-trackways F F' travel the mold-carriages G G', carrying the sectional molds, in which the gathering of plastic glass is molded and formed as it passes around the circuit of the machine. These carriages are carried by sprocket-chain 82, to which are attached carriers 25, Figs. 1, 2, 17, 18, 19, and 20, which have a vertical slotted way formed therein which receives a vertical traveler 55, attached to each carriage G, permitting the latter to rise and fall with the ascent and descent of the trackway, preserving at all times its horizontality, while the sectional mold carried thereon surrounds the glass article in process of formation. To each of the said clamps 25 is attached a vertical rod 15, connecting with a carriage on the upper plane or platform, later to be described. The said mold-carriages are made in two parts G G', Figs. 17, 18, 19, and 20, the main or back portion G being provided with two wheels $i i'$ and the front portion being provided with one wheel $i''$. The front portion G' and rear portion G are pivoted together by extensions 42 42', Fig. 18, so that the former drops downward on its one wheel at that portion of trackway F' at 31 which is depressed, while the back portion G remains at the original level on trackway F. The parts G and G' are provided with stops or strikers 54 and 54', Figs. 17, 18, 19, and 20, which come together when the portion G' is at the original level, preventing further displacement.

41, Figs. 1, 2, 17, 18, 19, and 20, is a sectional mold carried on carriage G', hinged thereto at 37 by arms 39. The halves or sections are normally held together by a strong spring, (represented by 40,) except at those intervals when the mold is required to be opened for insertion of plastic glass or removal of the finished product, which is done automatically by means hereinafter described. Hinged to said halves or sections of the mold by a universal-joint connection 35 36 are two arms 27 and 27', pivoted together at the rear and supported by a wheel 34. They are also furnished at this point of juncture with a wheel 33, adapted to run on cams, whereby the said arms are drawn back at the proper time, and the sections are thereby drawn apart. Main carriage G has an inclined extension 26, on which arms 27 27' can rest as the sectional mold descends with the front part of the carriage. This inclined extension is shown in Fig. 18 and also in Figs. 19 and 20; but the arms 27 and 27' are shown only in Figs. 19 and 20 to avoid too much complication in Fig. 18.

On base portion A, at two points thereof where the automatic opening of the mold takes place, stationary cam-tracks 28 and 28', Fig. 3, are located, which by encountering roller 33 serve to draw it back at the proper times against the tension of spring 40, thereby opening the sections and holding them apart until released by the cam. There is also borne on base A a cam 117, which has a function to operate a piston in the sectional mold in a certain class of operations hereinafter described. Said base-frame also carries the cam 96, the function of which is to pull down the inner member of the blow-iron in a certain class of operations hereinafter described.

Upon the top platform or upper frame plane B are the trackways $f\ f'$, upon which run the top carriages or cars E E. These cars, as heretofore stated, are connected with bottom carriages G G' by vertical connections 15 and run in unison with the said carriages, being driven coincidently therewith by the sprocket-chains 69, running over upper sprocket-wheels P P, through clamps $h$ and hinged connecting-arms $g$, attached to the chain and car, respectively. The vertical connections 15 spring from clamps 25 and have an outward bend in them just below upper plane B, as in Fig. 1, to enable them to be attached to the outside of the upper car. The function of the vertical connections is to sustain horizontal arms 49 49', with seats $c'\ c'$ in the ends, which support the blow-iron, in their revolution around the machine. The upper cars carry the blow-iron spindle, means for rotating and for raising and depressing the same, and means for supplying air thereto in regulated amount during the progress of the car. The means for supplying power to the said car as it travels is furnished by a stationary stretched sprocket-chain 67, supported on upper plane B by fixed supports 66, located at suitable intervals. On said upper plane are also located two stationary removable cam-tracks K J, the former for operating the air-supply and the latter for operating the rising-and-falling blow-iron spindle. The air-supply is received, as before said, from flexible pipes X X, which make connection with the air mechanism on the car by means of vertical pipe $o$.

The connection between stationary chain 67 and the rotary mechanism carried on the car E is made through sprocket-wheel 68, engaging therewith. This wheel is keyed on shaft 64, supported in tubular bearing 63. There is a support 99 carried on the car engaging with the said chain on its under side for the purpose of holding the chain to its work. It should be well lubricated or supplied with antifriction means, which may be in the form of rollers.

46 is the air-box, located on the traveling car. With it is connected the upright air-pipe $o$ and also the tubular column 61 for carrying the blow-iron spindle $p$. Said blow-iron spindle receives air from air-box 46 through the perforations 44, which are at all times within the hollow column 61. The air-spindle receives rotary motion from rotating shaft 64, through changeable-gear sprocket-wheels $k\ l$ and chain 65, the gear being changeable to afford different speed ratios for different classes of work. Provision for allowing the air-spindle to rise and fall while rotating is made through the device of a groove 70 in the spindle, Fig. 8, and a spline 71 to run in said groove, the sprocket-wheel $l$ being held to its place by lug 77, bolted to column 61 and taking into annular groove 72 on the sprocket-wheel. The rising and falling of the air-spindle is effected automatically by means of the cam-track J, as before stated. On this cam-track runs the grooved wheel 58, affixed to collar 60 by a strong stud 60', Fig. 21. Collar 60 runs loosely on the air-spindle between two collars 59 59, made fast on said spindle, with ball-bearings or other suitable antifriction means between. The form given to the cam-track governs the time and degree of the rise and fall of the air-spindle, according to the exigencies of the work in hand, and the cam-track may be changed to suit different kinds of work. The air-spindle is formed at the lower extremity with a suitable coupler $r$ to engage with transverse pins 81 on the upper end of the blow-iron.

The means for automatically regulating the air-supply is as follows: K is a cam-track formed with raised and depressed portions, according to the demands of the work in hand. It is preferably made removable and replaceable, so that it may be exchanged for another to suit work of a different character. On said cam-track K runs the flanged wheel $j$, affixed to collar 76, surrounding air-pipe $o$, by means of a strong stud $j'$. Air-pipe $o$ is slitted at 47 for a suitable distance, and air escapes through this slit in greater or less quantity, according to the position of collar 76 on pipe $o$ as governed by the cam-track, thus varying the pressure and quantity of air delivered in the air-box from constant-pressure pipe 4 and tubes X X, the bore of said air-conduits X X being of maximum capacity to suit the largest article required to be molded in this machine.

The collar 76 is held to the cam-track K by the spiral spring 75, taking bearing against fixed collar o' on air-pipe o and having sufficient range of movement for all positions of collar 76.

To the base A is firmly attached by bolts or otherwise the separator before mentioned, an auxiliary mechanism, (shown in detail in Figs. 2, 3, 4, 5, 9, 12, 13, and 14,) the duty of which is to receive the blow-iron with the finished product attached as it leaves the molds and engages the cam-track W W, which transfers it to the separator. On said separator is an upright shaft q, receiving rotary motion from shaft D by a downward prolongation thereof passing through the base of the machine, on which is fixed the sprocket-wheel P'', Fig. 2, thence through chain n to sprocket-wheel m' on shaft m, pinion m'', and chain n' to sprocket-wheel q'', the original motion being by this train of gearing greatly reduced in speed. Said shaft q is mounted in a frame Z, having bearings at top and bottom. On top of shaft q is a star-wheel V, having a plurality of radial arms equidistantly spaced, preferably six, as shown in plan view, Fig. 5. There is a similar star-wheel V' mounted on the lower part of the separator concentric with shaft q, which receives motion from said shaft and runs in unison with star-wheel V by means of sprocket-wheels t t', chain s', shaft s, supported in bearings u u', sprocket-wheels $t^2 t^3$, and chain s'', thus giving the same speed and direction of rotation to both star-wheels. Said star-wheels are formed to carry clamps v and have also extensions w w, the function of which is hereinafter described. On shaft m is a second large sprocket-wheel $m^3$, which communicates motion to sprocket-pinion q' through chain x, in this case multiplying the speed received from shaft D. Said pinion q' carries a crank-pin z', Figs. 2, 3, and 9, connecting with a link or pitman z, which connects with the crank-pin on crank or reciprocating arm y'', on the shaft of which gear-pinion y is mounted, which engages with and imparts motion to two reciprocating racks 20 20, which operate crushing-jaws M M'. A rapid to-and-fro motion is thus imparted to the said jaws, the function of which is to break off the brittle refuse of glass on the blow-iron. To the crank-pin of crank-arm y' is also connected the link or rod 21, Figs. 3, 13, and 14, which is connected at the other end to crank-arm 21' on shaft 2' to operate striker-arm 2. The same rapid to-and-fro motion of crank-arm y' is thus communicated to said striker-arm, the function of which is to strike and break up the thin and brittle extension of the glass article after blowing, hereinafter described. In this connection there is a vessel 5, Figs. 3, 12, 13, and 14, for the reception of water or other suitable fluid, having a wiper or small pipe 5', through which the said fluid trickles, the function of which is to come into contact with the end of the blow-iron immediately after the finished product has been broken therefrom, which excites tension in the particles of the refuse glass left on the blow-iron, making it so brittle as to readily break off from the blow-iron when the latter comes between the crushers M M'. Upon the said separator are the circular upper and lower ways O O' Q Q', Figs. 2 and 9. The ways O O' are covered on their faces with some frictional substance, such as leather, where they come in contact with the blow-iron, the function of which is to rotate the latter as it is borne loosely in its clamps around the separator. The ways Q Q' are for the purpose of opening clamps v', borne on arms v, as hereinafter explained.

The ways W W, which receive the blow-iron from its supports and transmit it to the separator after the forming of the article is completed, are supported by a strong standard W', furnished with braces b' b', which are firmly secured to the side of base A, Fig. 3. This point of attachment is necessarily shown broken away in Fig. 1 to exhibit other parts.

In Figs. 23, 24, 25, 26, and 27 I have illustrated the typical form of blow-iron which I employ in this machine for certain kinds of work, which can, however, be variously modified without departing from the essential invention embodied therein. The leading feature of this blow-iron is the enlarged hollow portion 92 at the lower end thereof to accommodate the mechanism contained therein for performing certain kinds of work not feasible with the plain tubular iron. In this enlarged portion is contained a tubular plunger 91, capable of being projected beyond the lip 89 of the blown-iron or withdrawn into the tubular cavity by automatic means, about to be described. Near the top of the cavity, when the plunger is in its retracted position, Fig. 24, is the sliding washer 83, attached by rod 86 to the top of the plunger, said washer being perforated by passages 104 to allow air to pass. At a suitable distance below the washer, determined by the range of motion to be given to the plunger, are the pins or other suitable bearing-seats 87, on which rests the spiral spring 84, which bears against the under side of the washer, the function of which is to lift the plunger and withdraw it within the cavity when not under compression. This compression is effected by means of the loose collar 56, surrounding the blow-iron and attached to the plunger by pins 88, which play up and down in slots 57, provided in the blow-iron for that purpose. Said collar is operated from the outside by cam 96, for the purpose, borne on base A at the proper point for operating the plunger as the carriage with its sectional mold containing the gathering of glass on the end of the blow-iron passes the same in its circuit around the machine. The perforation in the plunger is bifurcated, as shown at 93, to allow the air to pass by the connection of the plunger with the connecting-rod 86. The blow-iron has annular recesses U U formed at suitable intervals to engage with the clamps $v$, which loosely hold the blow-iron in the machine while carried around in the separator and at the same time revolving, also while carried in rests $c'$ $c'$ on arms 49 49', which project from vertical rods 15. The blow-iron also has collar L for sustaining it while traveling on track W in leaving the machine for the separator. It is evident that the recesses U could also be formed with collars, if deemed preferable, such as are used on the ordinary blow-irons, or they might be combined in function with collar L. The blow-iron also has transverse pins 81 at top for engagment with the clutch or coupler $r$ on the air-spindle.

In Fig. 27 I have illustrated the way in which the plunger operates while forming a bottle or jar with projecting annular lips, 41 being the closed sectional mold; 91, the plunger, perforated as shown at 90; 115, the gathering of glass; 116, the air-bottle just forming; 94, a piston movable in the cavity of the mold, and 113 a flange-wheel moving on a cam-track 117 on base-frame A for giving the requisite expansion and contraction to the mold-cavity for forming and blowing this class of articles. 111 is a screw holding wheel 113 to base-piece 108, allowing said wheel, with its supporting-plate 110, to slightly swivel thereon while following the curve of the cam-track.

The plunger may be slotted or grooved to allow air to pass between it and inside of the blow-iron without departing from the spirit of this invention. The object of the plunger is to shape the interior of the neck irrespective of the outer configuration of the lips. If it were not for the plunger, and air-pressure alone were employed, the interior configuration would follow that of the exterior lip, preventing a smooth outflow.

The object of spring 107 is to give elastic or yielding action to the piston 94. The movement of said piston upward is governed by cam-wheel 113 and cam-track 117. Collar 106 is fast on stem 105, and said stem plays freely in base-piece 108, having a washer 109 on the end to hold 108 from dropping off when in suspension. Between collar 106 and the base-piece 108 is the spring 107, by which means only an elastic pressure is applied to the glass when the base-piece and roller are forced upward by the cam-track. Without this expedient rigid pressure would be applied, which would endanger the mechanism, since the gathering of plastic glass cannot be accurately gaged to the same exact amount each time. This wheel-actuated bottom-former is not in use when paste-lined molds are employed making tumblers and lamp-chimneys, not being required for that class of articles.

The object of the descent of the tracks F and F'' at 100 is to lower the mold-carriage while the mold contains the article of glass just finished in formation, and thereby stretch the surplus portion of plastic glass above the sectional mold, in conjunction with the air-pressure, which at this point is at its highest, into a long and delicate film or shell of glass, which while strong enough to hold the finished article while the mold is opened to carry the same to the separator can be easily broken off from the blow-iron by a slight stroke in said separator. Such film is shown at 10 in enlarged view in Fig. 26. The remaining portion of glass attached to the blow-iron is chilled in the separator, as before explained, and entirely removed in the crushing-jaws M M', which are in constant motion. This process of stretching may also be assisted by arranging the top car so as to rise upon an ascending track at the same time that the bottom carriage descends.

The object of the descent of track F' at 31 is to cool the mold carried on front portion G' of the carriage when paste-lined molds are employed, 31 constituting a well or tank and having water placed therein. With this class of molds also the means for rotation of the blow-iron on the upper car and for supplying regulated air thereto are put in operation. When plain unlined molds are employed, the rotary motion of the blow-iron is dispensed with by simply removing the chain from the changeable-gear sprocket-wheels $k$ $l$, and regulated air may be used or not as the class of work may require, the regulation of the air-supply being dispensed with by an obvious disconnection of parts. Water is omitted from tank 31 in such cases and the descent of trackway F' is bridged at that point by bridge-piece 102 102, Figs. 1$^a$ and 1$^b$, making the track level to correspond with track F.

The object of the cam-tracks W W is to engage the blow-iron just as the article is completed and the air-spindle has lifted off from the blow-iron and the sectional mold has opened and carry the same to the separator. This is effected by the coöperation of the star-wheel V, Figs. 2, 3, 5, and 9, the arms or extensions $w$ of which come into contact with the blow-iron just as it is released, and having a rapid rotation sweep said iron out of the clamps that held it in its progress around the machine and carry it into the separator along said tracks W W until the blow-iron becomes engaged with the clamps $v$, borne on the star-wheel V. It is held loosely in these clamps, so that it can rotate. Here it first encounters the striker or cracker rod 2, Figs. 3, 12, 13, and 14, having a rapid to-and-fro motion, which breaks up the film or shell 10, and thus detaches the finished article, which drops into a receptacle. At this point the wiper 5', connected with the fluid-receptacle 5, touches the glass left on the blow-iron, chills it, and prepares it for the crushers. The blow-iron next comes into contact with the frictional-faced arcs O O', which cause it to revolve as it travels, thus bringing fresh portions of refuse glass in contact with the crushers M M' in rapid reciprocation, which quickly clear the blow-iron of the remains of glass adhering to them. The tracks Q Q' by this time come into play, opening the clamps v v, releasing the blow-iron, and allowing it to fall into a receptacle provided for it. The clamps v remain open until they receive a fresh blow-iron from tracks W W, swept into them by star-wheel arms or extensions w w, when the clamps firmly close upon the irons as soon as the tails thereof, 22, are relieved from the pressure of the tracks Q Q'. Six arms are shown upon star-wheel V and six extensions w, carrying six clamps v, which number is found sufficient in practice. The rotation of the star-wheel is much more rapid than the progress of the blow-iron around the machine, so that not every clamp engages an iron in the cycle of operation.

On the front of the machine is the stationary cam 28, supported on arm 95. The object of this cam is to automatically open the sectional mold just prior to the insertion of the blow-iron at the beginning of the cycle of operation. It will be observed that this cam-arm 95 reaches past the blow-iron in the illustration and would appear to obstruct its passage, but in fact the blow-iron is not inserted until the receivers have passed this point. This cam-track extends part way around the front of the machine, as shown in Fig. 3, and operates the wheel 33 when the latter comes into contact therewith, carrying the same back until the mold is pulled open by means of arms 27 27' and held open until it receives the fresh gathering of plastic glass on the lower end of the blow-iron. The mold then closes by reason of the shape of the cam allowing wheel 33 to return, and is not afterward opened until wheel 33 again engages cam 28' at the other end of the machine when the article is finished and ready to be removed from the mold. The operation of this second cam, being precisely similar to that of cam 28, need not be more particularly described. During the transit from cam 28 to cam 28' the closed mold is carried forward on the car through its circuit around the machine, undergoing the operation of blowing and forming the article, the air-spindle having automatically made connection and commenced rotation when the paste-lined molds are employed, and the air-regulating apparatus being also in operation. The operation of cam 28' does not come into play until the mold-carriage has descended into depression 100 and stretched the glass to the form shown in Fig. 26. At this point are located the cam-tracks W W, Figs. 1, 2, and 3, whose function has been stated. After the article is removed from the mold the mold-carriage ascends again to main level, the rear portion G remaining at that level, while the front portion G' runs down the descent into tank 31 when paste-lined molds are employed for the purpose of cooling the latter by immersion in the water in the tank. The mold is closed at this time, and preferably so, openings being provided to permit the water to flow out. The extension 26 on G is provided for arms 27 27' to run upon when the mold is being dipped. The said arms are enabled to accommodate themselves to the various positions necessary by means of universal-joint connections 35 36.

In this machine when paste-lined molds are employed I can make articles of the finest quality of glass, such as tumblers and lamp-chimneys, a fine grade of bottles, &c., in which it is desirable to avoid the showing of the seams or fins which sectional molds produce. When poorer qualities of glass are to be worked, as on cheap bottles, vials, &c., in which the seams produced by the sectional mold is of no consequence, unlined molds can be employed and the water-tank bridged, as above described. In all cases where bottles with lips are made the blow-iron with plunger inside (shown in Figs. 23, 24, and 27) comes into use.

Taking the machine when at rest I will first describe how it is operated when the paste-lined mold is used during one cycle of operation, all other cycles being simply duplicates thereof.

The machine having been brought to its proper position in front of the furnace the handle on the automatic starting, stopping, and regulating rheostat is moved and set at a position that gives the machine the correct speed for the work in hand. A blow-iron has been inserted in the furnace and a gathering of plastic glass made upon the end of same of sufficient size for the article to be formed and at the correct heat for proper manipulation. This gathering of plastic glass is manipulated on the marver and slightly by lung, the same as is now done preparatory to working, if the article was to be blown by the old process, in stationary sectional molds worked by foot-pressure or by an attendant as the work in hand would demand. At this time a sectional paste-lined mold in its course around the machine has presented itself to the operator, who at once places the blow-iron in the supports or clamps provided to receive them. Immediately the mold closes automatically by action of the cam 28, which operates to release wheel 33. While the mold is closing around the plastic glass, the blow-iron spindle of the machine at once comes down by action of cam-track J and the chuck r engages with the pins on top end of blow-iron, giving it rotary motion and being in a position to supply regulated air as the case may demand. As soon as the sectional mold closes, collar 56 on blow-iron comes into contact with the cam 96. This cam forces the collar down and with it the plunger inside of the blow-iron. This plunger while it is coming down has a very small pressure of air in same. The action of the plunger is to force the glass apart away from the central hole already in same, made by hand and lung manipulation outside the machine, thereby forcing the glass away from the center. The glass at this time is fairly thick and is in sufficient quantity for performing the duty that the plunger executes. Said plunger forces it into the space 103, Fig. 26, of the sectional mold, the bottom former 94 meantime giving elastic support to the glass. It will be observed that this space 103 forms the neck or, rather, lips of the bottle, which are thicker than other parts of the bottle-neck, and the plunger forces glass into this space while there is sufficient glass for that purpose and before the real blowing of the article has commenced. Only sufficient air is supplied at this time to make the space clear and to start the glass bulb to expanding. Immediately the plunger is withdrawn by action of cam 96 releasing the collar 56 on blow-iron, said plunger being drawn back by means of spring 84 to its position inside the blow-iron. Air from the air-car on upper platform comes through the blow-iron past washer 83, spring 84, through apertures 93 and central hole 90 into the bulb of plastic glass within the sectional mold. The blowing thus continues when paste-lined molds are used just as it would with an ordinary blow-iron at work on an article not requiring a lip. Were it not for this plunger in the blow-iron the article under formation would be blown with an even shell throughout, and where the lips of the bottle were to be formed the glass would have a corresponding shape on the inside, only in the reverse, the glass taking nearly the same thickness all through the article. The special plunger blow-iron forms, in the way described, the lips of the bottle, while there is sufficient glass in this place before it has been distended by strong air-pressure, and this operation practically completes this part of the operation from the beginning, that of making the lips of the bottle and making the inside of the neck, which will be of a stated size in all articles made with the same-sized plunger. It will also make a taper hole and a round one. Further operation on this article in the sectional paste-lined mold is to expand the article to its ultimate shape against the paste-covered surface of the paste-lined mold by air-pressure. It also holds the outside of the lips of the bottle against the mold and enables the mold to smooth and perfectly round the bottle from the top of the mold to the bottom. Articles having practically the same thickness throughout—such as lamp-chimneys, fine tumblers, &c.—can be blown and formed on this machine, but in such case the plunger blow-iron is not necessary. Either the mechanism for operating the plunger is thrown out of action or an ordinary blow-iron is substituted. The mold has now started along the side of the machine. The air-pressure is increasing under regulated pressure. The blow-iron is revolving and carrying the article under formation along with it. While this is taking place the article under formation practically takes the shape shown in Fig. 25. This shape it assumes preparatory to entering upon the next stage, which is the stretching out of the surplus glass on outside of mold at 9. Reaching the other end of the machine the mold-carriage commences its descent at 100. While this operation is taking place, the air from the machine is supplied to the blow-iron at its greatest pressure. This action, as the mold recedes from the blow-iron, is to stretch the glass. Were it not for the air-pressure inside of the article the result would be a long and small tube of glass with a minute bore in same. By using the air-pressure I expand the glass into the shape illustrated at 10, Figs. 1, 2, and 26, showing a large cylinder or shell with very thin walls that will break when the walls cool with the slightest jar or stroke from the outside. This admits of the glass article being easily broken off from the blow-iron when it reaches the proper stage, state, and position. I wish it to be understood that I do not limit myself to the stretching of the glass for breaking it off under air-pressure, as I can accomplish the same purpose without the air by producing the small tube of glass described above. This last-named action will produce the results, but not quite as satisfactorily as when under the air-pressure, as the walls of glass are thicker, and it has a tendency to injure the lips of the bottle already formed by drawing them slightly inside. This, however, can be corrected by grinding later on after the glass is taken from the machine and cooled. I therefore wish to include both operations as part of this invention. The article of glass has now reached the position shown in Fig. 1 on the left-hand car at 10. The cam 28 has opened the sectional mold and the glass article is supported simply by the blow-iron, being still held in position by clamps $c'$ $c'$ on arms 49 49' and support 15. At this place the blow-iron comes into contact with the cam-tracks W W, Fig. 3. The blow-iron by this track W W is forced out from main machine and would break the clamps that held it were it not for the strikers $w$ $w$ $w$ $w$ $w$ $w$ on the star-wheel V. This wheel having a much more rapid rotation or rate of speed than the main machine at once commences to force the blow-iron ahead of the clamp that holds it, the blow-iron riding on the ways W W until it has left the main machine, space being provided for the glass article to come from the said machine. (See Fig. 9.) This space is cut from the frame of the machine and allows the article to pass, as shown. The article has now entered the separator, the clamps $v$ on the same now engaging with the blow-iron and holding it until it has passed through this machine. The clamp or the tail thereof has been riding on circle Q. (See Fig. 4.) The said tail leaving this circular way allows the clamp to grip without friction the blow-iron, leaving the blow-iron free to revolve on account of the hole in clamp being larger than the diameter of the blow-iron or the part thereof embraced by the clamp. The blow-iron is held firm in this manner. It is evident that this trackway Q could be reversed and the action of the clamp also by placing the said trackway on the other side of the machine and so constructing the clamp as to remain open at all times except when the tail was bearing on Q. The action of Q in this case would be to hold the clamp closed instead of open, as described. The blow-iron now being firmly fixed in the clamps commences its circuit around the separator. The first thing that encounters the glass article is the striker 2. (See Figs. 3, 9, 12, 13, and 14.) This striker is in rapid backward-and-forward motion. It comes in contact with the thin drawn-out stretched portion of the glass at 10. (See figures above mentioned.) The least stroke breaks this thin film or shell and separates the finished product from the blow-iron. The article drops from this separator and falls into a receptacle made for it, which may be a carrying belt, box, or chute or any other suitable conveyer. The blow-iron still has a slight gathering of glass on its end that now is to be removed. First it comes into contact with the wiper 5', which is slightly moist with liquid from the tank 5. This causes tension in the glass and crackles it. The blow-iron passes on and comes into contact with the two leather-faced stationary curved drivers O. (See Fig. 9.) These give the blow-iron rotation. The end of the blow-iron enters the crushers. These are in rapid motion back and forth, and this action breaks off all the refuse glass on the end of the blow-iron, the latter presenting a fresh surface continually to the crushers until all refuse glass has been removed. The blow-iron now comes out from the separator. After it has got well clear from the crushing-jaws the cam or circular trackway Q Q' engages the clamps or tail 22 thereof and releases the blow-iron, which now falls to any convenient receptacle for conveying it away from the machine or remains in the box at the side of the machine until removed by the gatherer when he wishes a fresh iron.

We will now go back and take up the sectional paste-lined mold where we left it—viz. in 100, having descended to the lowest part of the trackway at this point while the article is taken from the mold. The mold-carriage now rises on the ascending trackway (shown in Fig. 1) in front of shaft R. The back part G of the mold-carriage continues at this higher level and the front part G' of the carriage runs down the descent on its single wheel until it reaches the bottom of water-tank 31, where it remains for a short time and is covered with water for wetting and cooling the mold and its paste-covered interior. I find that it is an advantage to have the sectional mold wet while closed. It simplifies mechanism and gives a good circulation of water through same by means of holes drilled in the bottom of the mold for that purpose.

Unlike other machines, I dip my molds while closed. I open and close them automatically twice for a cycle of operation. After wetting and cooling the mold now rises on the carriage G' until it is at the same level with the rest of the carriage. It now is nearing the front of the machine and is about to encounter the cam 28 for opening the sectional mold preparatory for receiving a fresh gathering of plastic glass. I have described one cycle. During the time that this has been taking place the other pairs of carriages are getting in their work in exactly the same manner. There can be as many pairs as may be desired for fast and satisfactory working, dependent on the size of the machine, the present machine being designed for four.

Having described the action of the machine when used with sectional paste-lined molds, I will now take up the action when the machine is at work on sectional molds not paste-lined.

I will, as before, simply take one mold and follow its action around the machine during one cycle. I first remove sprocket-chain 65 on the air-car. This removes the power of rotating the blow-iron spindle and with it the blow-iron. Each of these is now free from rotation, but free to perform the other movements provided for them. I take a piece of metal or material 102, provided to bridge space 31, which is the water-tank where the mold in the previous operation, when the paste-lined one was used, was dipped for cooling. This bridge having been supplied, bridging space 31, the sectional mold passes over the same on a level with the rest of the mold-car. Following one mold-car from the start we will first take it in position ready to receive a plastic mass of glass on a blow-iron. The sectional mold will have been previously brought to a correct heat by means of hot plastic glass supplied to same or by outside heat, such as a flame of gas or otherwise. The object is not to chill the plastic glass, which it would quickly do were it not heated. On this account molds worked without paste linings require to be heated before starting to making glass; but after the molds have once been heated the hot glass as it is supplied to same in operation keeps the molds at a satisfactory temperature, and no cooling in this machine is then required, as the short distance traveled without glass in the mold allows the molds to retain the proper amount of heat. Glass has been gathered on the blow-iron as before and manipulated as done for blowing by hand and in stationary unlined molds. It is then inserted in the machine at the front end on the right. At once the mold closes upon same and immediately afterward the plunger in blowpipe is forced automatically into the space provided for it; but just before this plunger forces its way into the mass of plastic glass the wheel 113, Fig. 27, has run up on the track 117, and this action forces the shaft 105 with its bottom former 94 against the mass of plastic glass. This bottom former is not forced with a rigid pressure, but with a yielding or elastic pressure, on account of the spring 107 allowing of an elastic pressure on the bottom of the plastic glass. If the mass of plastic glass is not exactly uniform, this elastic pressure accommodates itself to the slightly-different gathering of glass that may be on the blow-iron at different operations. This bottom former being forced against the mass of plastic glass 115 makes a bottom support for the plunger 91 to work against and admits of sufficient glass being retained to form the lips and neck of the bottle when the plunger passes down. This action of the bottom former also assists in forming the bottom of the bottle or vessel at this time. Immediately after the plunger 91 has forced itself into the mass of plastic glass air-pressure is supplied and the bottom former recedes to bottom of the mold, allowing room for the operation of blowing to expand the glass and the formation of the bottle to be completed. Air can be supplied in regulated pressure or not as the case and work in hand may require. If uniform air-pressure is required, the air-regulating mechanism is simply put out of operation, which is done by taking off the flange-wheel *j*, Fig. 21. According to the work in hand depends the length of time that the plunger 91 remains in contact with the glass and its position in neck of bottle, and this is determined by the form of cam employed, which is preferably removable and replaceable. On some classes of work it is an advantage to have this plunger immediately plunged into the glass in the mold and at once withdrawn to its original position inside the blow-iron. In other cases, according to the same size of the article, the amount of glass employed, thickness of walls, &c., governs the greater length of time that the plunger remains in this position. It could remain during the entire operation of blowing large-necked bottles, jars, and some other classes of work, supplying air through the hole in same for articles under formation. In this class of mold I can blow such articles as fruit-jars, bottles of various sizes, shapes, &c., with good results. The sectional mold now continues on its course down the other side of the machine until it has reached the end of same. Here it descends the descent 100 and stretches the glass as described with the paste-lined molds. The mold opens automatically, as before, the glass article is removed to separator by means heretofore described, and goes through the same operation as with the other type, fully described above. The sectional mold now closes automatically by release of the cam and makes the ascent out from level 100 to the top level. It passes over the bridged water-tank back to its original position in front of the machine and automatically opens ready for a second gathering of plastic glass. It is understood that the top or air car in all of the described actions follows directly over the mold-carriage and puts in the work at the proper time, as planned.

I am not limited as to the work that this machine will do, as it will produce all such work as is now produced in paste-lined molds and in the other type, called "glass-presses," in which pressing is employed together with blowing. To such machines glass is furnished by ladling or gathering glass from the furnace on a working rod, and in this latter case a sufficient amount of glass is cut off from the working rod and the process of pressing and blowing the glass takes place without a blow-iron, on which glass is gathered in my machine.

It will be understood that I limit myself to work that can be handled on the blow-iron and do not attempt work made with two pieces of glass gathered on two different irons, such as making a glass pitcher, including the handle. I can make the pitcher, but cannot with this machine add the handle when in the machine as now constructed.

I claim and desire to secure by Letters Patent—

1. In a glass-working machine, in combination, a sectional mold, a two-part carriage therefor, an endless trackway for said carriage to run on, means for impelling said carriage around said trackway, and means for imparting to said carriage bodily a vertical rising-and-falling movement while being impelled around said trackway, substantially as specified.

2. In a glass-working machine, in combination, a sectional mold, a two-part carriage therefor, means for impelling said carriage in an endless path, means for imparting a vertical descent and ascent to said carriage at one point of its travel, and means for imparting a vertical swinging movement to one portion of said carriage at one point of its travel, substantially as specified.

3. In a glass-working machine, in combination, one or more molds each comprising hinged sections, a base on which said molds may move, means for moving said molds in a continuous circuit, means for causing said molds to open and close automatically at intervals, a depression in said base at a point of the path of said molds where the molds are in a closed condition, and means for causing the molds to descend into and rise out of said depression during their travel, substantially as specified.

4. In a glass-working machine, in combination, a two-part sectional mold, a two-part carriage therefor, an endless double trackway for said carriage to run on, means for impelling said carriage around said trackway, means for imparting to said carriage a vertical rising-and-falling motion while being impelled around said trackway, and means for imparting a separate falling-and-rising movement to one portion of said carriage while being impelled, substantially as specified.

5. In a glass-working machine, in combination, a base provided with an endless trackway, sectional molds arranged to travel on said trackway, with means for impelling said molds, means for automatically opening and closing said molds, at two points of said trackway, a depression for holding a cooling liquid at a point of said trackway where said molds remain closed, and means for causing said closed molds to descend into and rise out of said depression, substantially as specified.

6. In a glass-working machine, in combination, a sectional mold, a two-part carriage therefor, an endless double trackway for said carriage to run on, means for impelling said carriage around said trackway, and a depression for holding a cooling liquid at one point of said trackway, into which one track thereof descends, whereby one portion of said two-part carriage is caused to descend into said tank and dip and cool the mold carried thereon, substantially as specified.

7. In a glass-working machine, in combination, an endless double trackway, a two-part carriage to run thereon, a two-part sectional mold borne on said carriage, stationary cams to automatically open and close said mold at two points of said trackway, and between said cams a well or tank in the path of said carriage, into which one portion of said carriage descends with the mold thereon to dip and cool the said mold after closure, substantially as specified.

8. In a glass-working machine, a base, an elongated endless double trackway thereon, two-part carriages adapted to run on said trackway, sectional molds borne on said carriage, and stationary cams, one at one end of said base, and the other near the other end thereof, coöperating with said molds to automatically open and close the same as the molds pass the stations of said cams, substantially as specified.

9. In a glass-working machine, in combination, an air-conduit, a sectional mold, a removable blow-iron, means for sustaining said blow-iron in operative relation to said air-conduit, mold and blow-iron in a continuous circuit while in operative relation, and means for extending the distance between said blow-iron and said mold at a certain point of said circuit, whereby the plastic glass under treatment is stretched above the mold, substantially as specified.

10. In a glass-working machine, in combination, an air-conduit, a sectional mold, a removable blow-iron, means for sustaining said blow-iron in operative relation to said air-conduit and said mold, means for carrying said air-conduit, mold, and blow-iron in a continuous circuit while in operative relation, means for automatically opening and closing the mold at two points of said circuit for the insertion and removal of the blow-iron into and out of relation with the mold respectively, and means for dipping and cooling said mold, after closure and before opening for the insertion of the blow-iron, substantially as specified.

11. In a glass-working machine, an elongated base portion having a double endless trackway thereon, portions of said double trackway being non-circular, depressed places in the base into which portions of said trackway descend, carriages adapted to run on said trackways, means for impelling the carriages, and means for enabling said carriages bodily to follow the inequalities of level of the trackways, substantially as specified.

12. In a glass-working machine, a base portion having two endless trackways thereon, a depression into which both of said trackways descend, a depression into which one of said trackways descends, and carriages adapted to run on both trackways simultaneously, substantially as specified.

13. In a glass-working machine, a base portion provided with two endless trackways, depressed portions in said base into which said trackways descend, carriages to run on said trackways, an upper plane having level trackways over said base-trackways, carriages to run on said upper-plane trackways, means for impelling said upper and lower carriages in unison, and vertical connections between said carriages, substantially as specified.

14. In a glass-working machine, a base provided with a double endless trackway having inequalities of level, in combination with a carriage adapted to run on said trackway, means for impelling said carriage continuously along said trackway, and means whereby said carriage is enabled to rise and fall in contact with said trackway while being continuously impelled along the circuit thereof, substantially as specified.

15. In a glass-working machine, a base provided with two endless trackways having different inequalities of level for the respective trackways, a carriage in two parts to run on said trackways, means for impelling said carriage continuously along said trackways, means whereby said carriage is enabled to rise and fall in contact with said trackways while being impelled, and a pivot between the two parts of said carriage whereby the two parts are enabled to pursue different levels of the said trackways while being continuously impelled along the circuit thereof, substantially as specified.

16. A base provided with two endless trackways, a depressed portion in said base into which both trackways descend, a second depressed portion into which only one of said trackways descends, and in combination therewith a removable bridge-piece adapted to be inserted in said second depressed portion, whereby its trackway is brought to a level with the other trackway, substantially as specified.

17. A base provided with two endless parallel trackways, having depressed portions therein into which said trackways descend, carriages adapted to run on said trackways, an endless moving chain running parallel with said trackways for impelling said carriages thereon, carriers borne on said chain provided with vertical ways therein, and vertical travelers attached to said carriages, moving in said vertical ways, whereby said carriages are enabled to keep in contact with said trackways while being carried continuously forward by said carriers, substantially as specified.

18. A base provided with two endless trackways, a depressed portion in said base into which both trackways descend, a second depressed portion into which only one of said trackways descends, and in combination therewith a mold-carriage in two parts, adapted to run on said trackways, with means for impelling the same, said parts being pivoted together to permit them to travel at the same time on the different levels of the said trackways, substantially as specified.

19. A base provided with two endless trackways, having a depressed portion therein into which said trackways descend, a carriage adapted to run on said base-trackways, with means for enabling it to follow said depression while traveling, an upper plane having endless trackways over the base-trackways, a car adapted to run on said upper trackways, carrying a revoluble blow-iron spindle, means for supplying air under regulated pressure to said spindle, means for impelling said upper and base carriages in unison, a sectional mold carried on said base-carriage, and means for supporting a blow-iron in revoluble connection with said air-spindle, and with a gathering of glass within said sectional mold, whereby when said base-carriage descends into the said depression the glass outside of the mold is stretched and blown into a thin shell, substantially as specified.

20. A base provided with two endless trackways, depressed portions in said base, a two-part carriage adapted to run on said trackways, with means for impelling the same, a two-part sectional mold borne on said carriage, pivoted to one portion thereof by hinged connections, arms for opening said mold, secured to the sections thereof by universal-joint connections, joined to a roller 33, and in combination therewith stationary cams 28, 28' located on said base at the proper points to operate said roller and arms and open said mold, substantially as specified.

21. A base provided with two endless trackways, a depressed portion in said base into which said trackways descend, a second depressed portion or tank into which one of said trackways descends, capable of holding water, a two-part carriage adapted to run on said trackways, with means for impelling the same, said parts being pivoted together to permit them to travel upon different levels, a two-part sectional mold carried on one portion of said carriage, pivoted thereto by hinged connections, so as to descend therewith into the said tank to be dipped when in closed condition, substantially as specified.

22. A base provided with endless trackways, a cam-track 117 on said base, a carriage adapted to run on said trackways with means for impelling the same, a sectional mold borne on said carriage, a piston within said mold acting as a bottom support, a supporting-stem for the same, a roller coöperating with said cam-track for elevating said piston within the mold at the proper time, and elastic means between said roller and said piston whereby the latter is cushioned in its contact with the expanding mass of plastic glass, substantially as specified.

23. In a glass-working machine, as a means of stretching plastic glass, in combination, a blow-iron supplied with air, a sectional mold, a traveling carriage carrying the mold, trackways to sustain and guide the carriage, and a depression into which said trackways descend, whereby the carriage and mold are carried downward from the blow-iron at the proper time to stretch the gathering of glass, substantially as specified.

24. In a glass-working machine, in combination, an air-conduit, a sectional mold, a removable blow-iron, means for carrying said blow-iron, air-conduit, and mold in a continuous circuit while maintained in operative relation, and means for carrying said mold downward, away from the blow-iron at certain intervals, for stretching the plastic gathering of glass on the blow-iron while said glass is still connected with the mold, substantially as described.

25. In a glass-working machine, in combination, an air-conduit, a sectional mold, a removable blow-iron, means for carrying said blow-iron, air-conduit and mold in a continuous circuit while maintained in operative relation, means for automatically opening and closing said mold at certain intervals, and means for automatically dipping said mold after closure, while closed, at one point of the said circuit, substantially as specified.

26. A mold-carriage in two parts, pivoted together to allow said parts to travel upon different levels, and strikers 54, 54' on said parts respectively to limit their further movement when both reach the same level, substantially as specified.

27. A mold-carriage in two parts, pivoted together to allow said parts to travel upon different levels, a moving endless chain for impelling said carriage, a carrier on said chain with vertical ways, a vertical traveler attached to said carriage on one part thereof, moving in said vertical ways, a sectional mold borne on the other part of said carriage pivoted thereto by hinged arms, and means for automatically opening and closing said sectional mold, substantially as specified.

28. A mold-carriage in two parts, pivoted together to allow the said parts to rise and fall at different levels, a sectional mold borne on one portion and pivoted thereto by hinged connections, arms for opening said molds universally hinged to the sections thereof, and an inclined piece 26 to receive said arms when the mold-bearing portion of said carriage descends below the other portion, substantially as specified.

29. A mold-carriage in two parts, pivoted together, means for impelling the same in a continuous circuit, a means on one part for permitting the car to rise and fall vertically while being impelled, a two-part sectional mold on the other part, pivoted thereto, and means for automatically opening and closing the sectional mold at certain parts of the circuit, substantially as specified.

30. In a glass-blowing machine, in combination, a two-part sectional mold, a two-part mold-carriage, means for impelling said carriage in a continuous circuit, means for automatically opening and closing the mold, and a tank at one point of the circuit into which the mold-carrying portion of said carriage descends to dip the said mold when closed, substantially as specified.

31. A base with endless trackways thereon, having level and depressed portions, an upper plane having trackways thereon, carriages to run on said base-trackways and said upper-plane trackways, means for impelling said carriages in unison, sectional two-part molds carried on said lower carriages, means for automatically opening and closing said molds, a blow-iron spindle, means for rotating the same, means for supplying the same with regulated air-pressure, means for automatically raising and lowering the same, and means for sustaining a blow-iron in alinement with said blow-iron spindle and said sectional mold during the circuit of the said carriages, substantially as specified.

32. An upper plane with trackways, a car to run on said trackways, provided with an air-box, a pipe for receiving air from an outside source, a means for regulating the pressure of air in said pipe by an automatically-controlled escape-outlet, an air-spindle supplied with regulated air from the air-box, a means for rotating said spindle, and a means for automatically lifting and depressing said spindle while rotating, substantially as specified.

33. A car traveling on an elevated trackway, an air-spindle on said car, an air-supply pipe on said car connected with a source of supply, and with the air-spindle, and means in connection with said air-supply pipe for permitting an escape of air in automatically-regulated amounts, thereby varying the pressure of the air-supply delivered to said air-spindle, substantially as specified.

34. A car traveling on an elevated trackway, a rotary air-spindle on said car, a vertical rotary shaft, changeable-speed gears on said vertical shaft and said air-spindle for varying the speed ratio of the latter to suit different kinds of work, a sprocket-wheel on the said vertical shaft, and a stationary stretched sprocket-chain engaging with said sprocket-wheel, supported parallel with said trackway, whereby said air-spindle receives rotary motion by the travel of the car, substantially as specified.

35. An elevated trackway, a stretched sprocket-chain supported parallel thereto, a car traveling on said elevated trackway, a bracket-support 99 carried on said car engaging with the under side of said chain to hold the same in a fixed relation to the car, a sprocket-wheel 68 engaging with said chain, a rotary air-spindle on said car, and gearing between said sprocket-wheel and said rotary air-spindle whereby the latter receives motion from the stationary chain due to the travel of the car, substantially as specified.

36. In a glass-working machine, an air-conduit, a sectional mold, a removable blow-iron, means for supporting said blow-iron in operative relation to said air-conduit, and said mold, means for carrying said air-conduit, mold, and blow-iron in a continuous circuit while in operative relation, a means for automatically removing said blow-iron from said supports and transferring it to new supports, means for rotating the blow-iron in its new supports, and means for subjecting the end of said blow-iron to intermittent pressure for the purpose of removing any glass on the same, substantially as specified.

37. A separator for glass-working machines, comprising an upright rotary shaft, means for rotating the same, radial arms borne concentric with said shaft, and rotated therefrom, clamps on said arms, curved ways for operating said clamps, and for rotating a blow-iron transferred to said clamps from the glass-working machine, and reciprocating jaws, with means for reciprocating the same, to crush glass, substantially as specified.

38. In a glass-working machine, traveling carriages, upper and lower, a sectional mold borne on the lower carriage, a traveling air-supply conduit borne on the upper carriage, and means for supporting a blow-iron in operative relation to said mold and conduit respectively, in combination with ways W W and a separator for removing said blow-iron from said supports, said separator consisting of upright standard Z, rotary shaft $q$, star-wheels V V', radial arms $w$, clamps $v$, curved ways O, O', Q, Q', reciprocating crushers M M' and means for operating said crushers, and rotary parts, from the main machine, substantially as specified.

39. In a separator for glass-working machines, the combination of the upright rotary shaft $q$, upright hollow standard Z supporting said shaft, star-wheel V mounted on standard Z concentric with said shaft, and means for driving star-wheel V' from shaft $q$ in unison with star-wheel V, substantially as specified.

40. In a separator for glass-working machines, the combination of shaft $q$, star-wheels V V', having radial arms $w$ $w$, clamps $v$, standard Z, curved ways O, O', Q, Q', reciprocating crushers M M', means for operating said crushers, and means for rotating said shaft q, substantially as specified.

41. In a separator for glass-working machines, a vessel for liquids, 5, and wiper 5' in combination with reciprocating striker-arm 2, substantially as specified.

42. In a separator for glass-working machines, the star-wheels V V' and clamps v borne on said star-wheels, in combination with curved ways Q Q' for operating said clamps, substantially as specified.

43. In a separator for glass-working machines, the curved ways O for giving rotation to the upright blow-iron, in combination with the reciprocating crushers M M' for breaking up the remnant of glass on the end of said blow-iron, substantially as specified.

44. In a separator for glass-working machines, the combination of crushers M M' racks 20, pinion y crank-arm y', pitman z, crank-pinion z', rotary pinion q' and means for conveying rotation to said pinion from main driving-shaft, for operating said reciprocating crushers, substantially as specified.

45. In a separator for glass-working machines, in combination, rotary pinion q', pitman z, crank-arm y', pinion y, racks 20, crushers M M', connection 21, arm 21' and striker 2, substantially as specified.

46. In a separator for glass-working machines, in combination, revoluble radiating arms, means for rotating the blow-iron, reciprocating crushing-jaws, means for operating said jaws, a water vessel and wiper, and a reciprocating striker, for breaking glass films, substantially as specified.

47. In a glass-working machine, a sectional mold, a piston therein, mounted on a stem, a collar secured on said stem, a caster-wheel and wheel-support on the lower end of said stem, the support movable up and down on the stem, and a spring between said support and said collar whereby a yielding impulse is communicated from said wheel to said piston when the wheel is lifted, substantially as specified.

48. In a glass-working machine, a blow-iron, having a tubular enlargement at the gathering end, a retractable and protrudable plunger within said enlarged portion, perforated to permit the passage of air therethrough, means within said blow-iron for retracting said plunger, and means external to said blow-iron for extruding said plunger, while air is being blown through the same into a gathering of glass on the end of the said blow-iron, substantially as specified.

49. In a glass-working machine, a blow-iron, having a tubular enlargement at the gathering end, a retractable and protrudable plunger within said enlarged portion, a passage for air through said plunger from the blow-iron, a spring to retract the plunger, a washer 56 for enabling the plunger to be protruded from the outside, and slits 57 for enabling connection to be maintained between said plunger and said washer, substantially as specified.

50. In a glass-working machine, in combination, a sectional mold, a blow-iron, having an enlarged tubular portion at the gathering end, a retractable and protrudable tubular plunger within said enlargement, means for automatically sending air through said blow-iron and said tubular plunger, and means for automatically protruding said plunger with the mass of plastic glass gathered, on the end of said blow-iron while said glass is within said sectional mold, substantially as specified.

51. In a glass-working machine, a traveling carriage, a sectional mold borne thereon, a piston in said mold, sustained on a stem passing downward through the carriage, a roller at the bottom of said stem, an elastic means between said roller and said stem, whereby pressure transmitted to the piston from said roller is modified according to the resistance encountered, substantially as specified.

52. An improved blow-iron for glass-working machines, consisting of a tube having an enlarged tubular portion 92 at the lower end, a plunger 91 therein, slits 57 in said tubular portion, washer 56 connected with said plunger through said slits, retractable spring 84, rod 86, and movable perforated washer 83, substantially as specified.

53. A blow-iron for glass-working machines, having an enlarged tubular extremity, a plunger therein, having an unobstructed passage for air through the same, means within the tubular enlargement for retracting said plunger, and means external to said tubular enlargement for protruding said plunger, substantially as specified.

54. A sectional mold for glass-working machines, having a plunger therein, a means outside of the mold for operating said plunger, and elastic means between said operating means and said plunger for obtaining a yielding pressure of the plunger upon the glass to be operated upon, substantially as specified.

55. A sectional mold for glass-working machines, means for carrying said mold in a continuous circuit, a plunger in said mold, and means outside of said mold for operating said plunger automatically while the mold is being carried in its circuit, substantially as specified.

56. A base provided with an endless trackway, a depressed portion therein into which said trackway descends, a car traveling on said trackway carrying a sectional mold, and a bridge-piece, for bridging said depressed portion, at times when the sectional mold is not required to be depressed, substantially as specified.

57. A car traveling on an elevated trackway, an air-supply pipe on said car connected with a source of air-supply, a traveling support for a removable blow-iron connected with said car, means between said air-supply pipe and the removable blow-iron for conveying air to said blow-iron, and means connected with said air-supply pipe for permitting an escape of air in automatically-regulated amounts, thereby varying the pressure of air delivered to said blow-iron, substantially as specified.

58. In a glass-working machine, an air-conduit, a sectional mold, a removable blow-iron, means for supporting said blow-iron in operative relation to said air-conduit and said mold, means for carrying said air-conduit, mold and blow-iron in a continuous circuit while in operative relation, and means for automatically removing said blow-iron from said supports and transferring it to new supports while in motion, substantially as specified.

In testimony whereof I affix my signature in presence of two witnesses.

IRVING W. COLBURN.

Witnesses:
L. H. COLBURN,
STELLA B. COLBURN.